May 26, 1936. A. LUMSDEN 2,042,012

METHOD OF MANUFACTURING COMPOSITE DIES

Filed Feb. 15, 1932

INVENTOR
Alexander Lumsden.
BY
Harness, Dickey, Pierce & Hanns,
ATTORNEYS.

Patented May 26, 1936

2,042,012

UNITED STATES PATENT OFFICE 2,042,012

METHOD OF MANUFACTURING COMPOSITE DIES

Alexander Lumsden, Royal Oak, Mich., assignor to Forging and Casting Corporation, a corporation of Michigan Application February 15, 1932, Serial No. 593,072

3 Claims. (Cl. 76—107)

This invention relates to methods of making die stock and it has particular relation to methods of forming die stock of the composite type.

The main objects of my invention are to provide a method of economically forming dies having machine steel bodies and tool steel cutting edges; to provide a simple and economical method of forming composite angle bars suitable for die stock having a branch of tool steel and a base of machine steel permanently united thereto; to provide a method of forming composite die stock that can be made up in large quantities and sold in the form of straight bars to the user and then bent into any desired form by him to provide dies; to provide a method whereby bars of composite die stock can be formed from billets by a simple rolling operation to reduce the amount of welding required in the formation of composite dies.

These and other objects will be apparent from consideration of the accompanying drawing and perusal of the appended specification.

It has heretofore been proposed to manufacture composite die stock of L-shaped cross section comprising a base portion of machine steel and an upwardly extending branch or cutting edge of tool steel by welding a bar of tool steel and a bar of machine steel along their edges to provide an angle member in which the machine steel constitutes a base and the tool steel projected upwardly therefrom to provide a cutting edge. Such methods were objectionable because an excessive amount of welding was required to unite the two portions of the die stock and, furthermore, the unions obtained between the tool steel and the machine steel were relatively weak and in the operation of bending and forming the stock after the welding operation, separation of the two bodies of steel along the line of weld frequently occurred.

My invention consists in a method of forming composite die stock in which the objectionable features heretofore encountered are overcome by welding a relatively heavy bar or billet of tool steel to a corresponding bar or billet of machine steel to form a composite body and this body is then passed through rollers to elongate it and to shape it into an angle or other suitably formed member having the tool steel in one branch and the major portion of the machine steel in the other branch.

For a better understanding of the invention, reference may now be had to the accompanying drawing, in which:

Figure 1 discloses a bar or billet of tool steel suitable for use in the manufacture of a die stock in accordance with the provision of my invention.

Fig. 2 discloses the operation of welding the bar of tool steel disclosed in Fig. 1 to a base bar or billet of machine steel.

Fig. 3 discloses the composite billet in a form suitable for rolling into a die stock.

Figure 1:
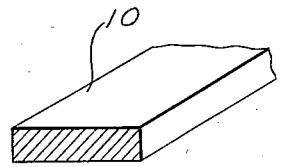
Figure 2:
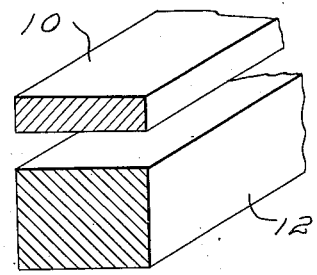

In practicing the invention I provide a relatively heavy bar or billet of tool steel 10 as represented in Fig. 1. This bar or billet is then welded to the base of a somewhat heavier bar or billet of machine steel 12 as represented in Fig. 2. The welding operation may be performed in any convenient manner. However, it is preferable to perform the operation electrically by holding the two bars or billets a slight distance apart and causing an electric arc to pass therebetween to reduce the two bodies of metal at their adjacent surfaces to a liquid condition. Approximately 10 to 50% of the tool steel and machine steel may thus be melted away before the two bodies are brought into contact with each other.

Very satisfactory results are obtained by causing 20 to 30% of the steels to liquefy. By this operation thorough intermingling and alloying of the tool steel with the machine steel is obtained and when the two bodies are then pressed together a union is obtained which is devoid of any particular line of demarcation of the two metals and which is possessed of practically as great strength as the main body of the billet.

Figure 3:
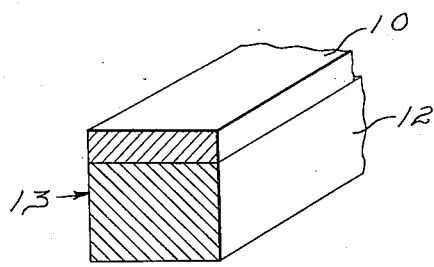
Figure 5:
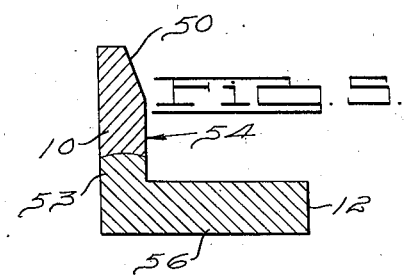
Fig. 5 is a cross-sectional view of a finished bar of die stock.
Figure 4:
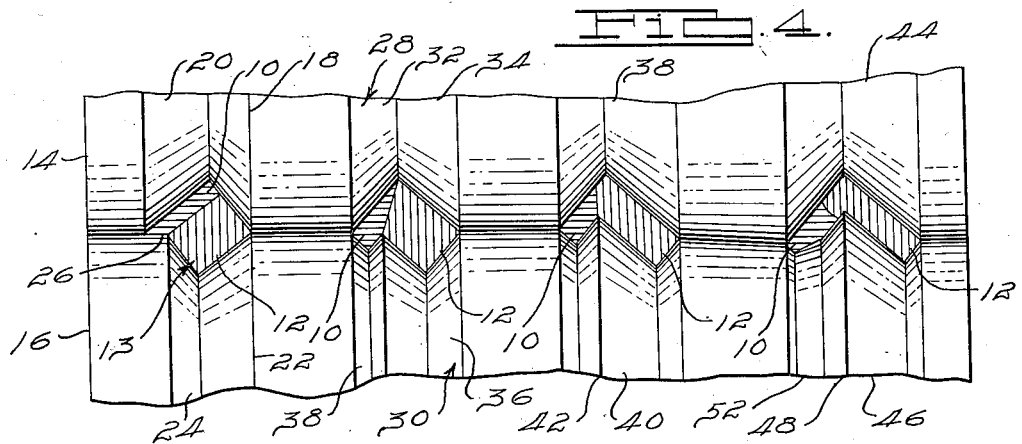
Fig. 4 is a fragmentary plan view of a system of profile rollers which may be employed in forming the billet disclosed in Fig. 3 into desired shape.

The composite billet 13 thus obtained as shown in Fig. 3 comprises a base 12 of machine steel and an upper face layer 10 of tool steel practically integrally bonded thereto. The billet or bar is then subjected to a rolling operation in order to impart thereto the desired L-shaped cross-sectional configuration disclosed in Fig. 5. In this operation the profile rollers conventionally represented in Fig. 4 may be employed. It will be understood that a single set of rollers having a plurality of profile grooves formed therein may be employed or a plurality of sets of rollers each having one or more sets of grooves may be employed. The rollers may, also, be banked in sets of three or more so that the billets may be rolled while traveling forwardly or rearwardly. The particular number and arrangement of the rollers is purely conventional and does not constitute a part of the present invention. For that reason it is not illustrated in detail and it is to be understood that the arrangement disclosed in Fig. 4 is purely for purposes of illustration.

Preferably, the profile grooves of the upper roller 14 and the lower roller 16 are so formed that the billet or bar 15 may be passed therethrough in a tilted or slanted position with the plane thereof intersecting the axes of the rollers. The first set of grooves may be of simple V-shape with one edge 18 of the upper groove 20 substantially registering with the corresponding edge 22 of the lower groove 24. The groove 24 preferably is somewhat narrower than the groove 20, thereby providing a shoulder 26 which forms a slight indentation or V-shaped channel along one side of the billet 13 having its apex substantially at the line of weld between the body 10 of tool steel and the body 12 of machine steel.

The billet after passing through the grooves 20 and 24 is next passed through grooves 28 and 30 respectively formed in the upper roller 14 and the lower roller 16. The groove 28 may be of simple V-formation with the side 32 thereof which contacts with the tool steel 10 somewhat narrower than the side 34 which contacts with the machine steel body 12. The groove 30 is of compound cross-sectional configuration and really comprises two adjoining V-like grooves 36 and 38', the former of which is relatively large and receives the body of machine steel and the latter of which is somewhat smaller to receive the edge portion of the body of tool steel which is now crowded laterally with respect to the body of machine steel. In introducing the billets in grooves 28 and 30, the junction line formed by the apex of shoulder 26 is brought in approximate registration with the apex of the shoulder formed between the grooves 36 and 38' and the right hand face of the machine steel body 12, as viewed in Fig. 3, is held approximately parallel with the side 34 of groove 28.

The next set of grooves 38 and 40 are substantially identical with the grooves 28 and 30 in configuration except that they are somewhat wider than the first mentioned set of grooves and the ridge of metal 42 between the two grooves projects upwardly into the groove 38 and a space between the ridge and the adjacent spaces of the groove 38 is materially less than that between the corresponding portion of the grooves 28 and 30. It will be apparent that in the grooves 38 and 40 the tool steel 10 is further crowded laterally until almost the entire mass thereof is disposed along one side of the edge of the body of machine steel. It will be apparent that the composite bar as it emerges from these grooves begins to assume its final angular form. The bar is finally passed between grooves 44 and 46 which impart thereto the desired configuration as disclosed in Fig. 5. These grooves are quite similar to those disclosed at 38 and 40 except that they are somewhat wider and deeper and the ridge 48 approaches so close to the adjacent sides of the groove 44 that the sides or branches of the bar are flattened out to their full width. Of course as many sets of rollers as may be desired may be used. Under some conditions more grooves than shown in the drawing may be necessary in order to make the change in form of the billet more gradual. In passing through these various sets of grooves the composite bar is greatly elongated as well as modified in cross sectional contour. The inner corner of the body of tool steel is also beveled away, as shown at 50, by reason of the action of an angularly offset portion 52 upon one side of the ridge 48.

By the time the bar reaches this final step of forming, the tool steel is crowded entirely to one side of the machine steel and if the tool steel does not constitute too large a proportion of the entire body a portion 53 of the machine steel may even be crowded laterally into the branch 54 of the bar. The angle bars as thus obtained are composed of a body of machine steel having a flange of tool steel so firmly united thereto, that they may be bent and twisted into desired shape without any tendency for separation along the line of weld. For that reason straight bars may be made up in the manner shown and sold to manufacturers who can shape these standard shapes into any desired configuration.

Figure 6:
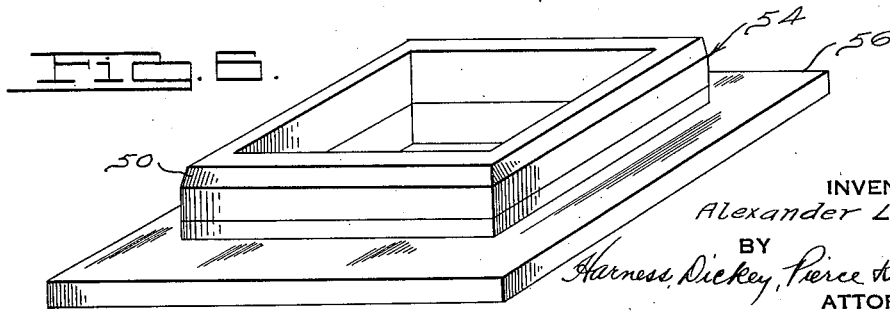
Fig. 6 represents a conventional die formed from stock of the type disclosed in Fig. 5.

In the conventional illustration of a die as disclosed in Fig. 6 the bars are shown as arranged in a rectangular configuration. However, this illustration is merely for purposes of exemplification. It is to be understood that the bars can be twisted and bent into an almost infinite number of forms. In this specific embodiment illustrated the base portion 12 of the die constituting one branch 56 of the stock is turned outwardly. However, this base portion may also be turned inwardly if desired.

It is further to be understood that similar methods may be employed in the formation of die stock bars of substantially T-shaped configuration. Of course in the manufacture of bars of such configuration appropriate modification of the cross section of the profile grooves of the rollers is required. However, such modification will readily be apparent to those skilled in the art. The process as thus disclosed is quite economical because the area required to be welded between the billet of tool steel and the billet of machine steel is comparatively small and yet the billets may be rolled to considerable lengths to provide a large amount of die stock. Therefore, the amount of welding required in the production of a given amount of stock is much less than that required where an angle portion of tool steel is welded upon an edge of a bar of machine steel in accordance with conventional practice.

Although I have shown and described only the preferred embodiment of the invention, it is to be understood that numerous modifications may be made in these embodiments without departure from the spirit of the invention or from the scope of the appended claims.

I claim:

1. A method of forming composite dies which comprises welding a bar of tool steel upon a side face of a bar of machine steel, from 20 to 30 per cent of the steels being liquefied during such welding to provide a union having practically as great strength as that of the main body of the die formed, and then crowding the tool steel laterally with respect to the bar of machine steel until the tool steel has been crowded entirely to one side of the longitudinal centerline of said side face of the machine steel bar to provide a cutting flange along one edge of the machine steel bar.

2. A method of manufacturing composite dies comprising welding a relatively massive billet of machine steel to a relatively massive billet of tool steel, from 20 to 30 per cent of the steels being liquefied during such welding to provide a union having practically as great strength as that of the main body of the die formed, rolling the composite body thus formed to elongate it and to crowd the tool steel laterally with respect to the body of the billet of machine steel until the tool steel has been crowded entirely to one side of the longitudinal centerline of the machine steel billet to provide a flange along one edge of the machine steel billet, and subsequently bending the die stock thus formed to dispose portions of the flange in angular positions with respect to each other.

3. The method of forming a composite die stock which consists in welding one of the wider side faces of a relatively heavy rectangular bar of tool steel to an equally wide side face of a relatively heavy rectangular bar of machine steel to form a composite body, from 20 to 30 per cent of the steels being liquefied during such welding to provide a union having practically as great strength as that of the main body of the die stock formed, and then crowding the tool steel laterally with respect to the bar of machine steel until the tool steel has been crowded entirely to one side of the longitudinal centerline of the side face of the machine steel bar corresponding to the face thereof to which the tool steel was welded to provide a cutting flange along one edge of the machine steel bar.

ALEXANDER LUMSDEN.